2 Sheets—Sheet 1.
M. TURNBULL & J. FOSTER.
Terrestrial Globe.
No. 209,993. Patented Nov. 19, 1878.
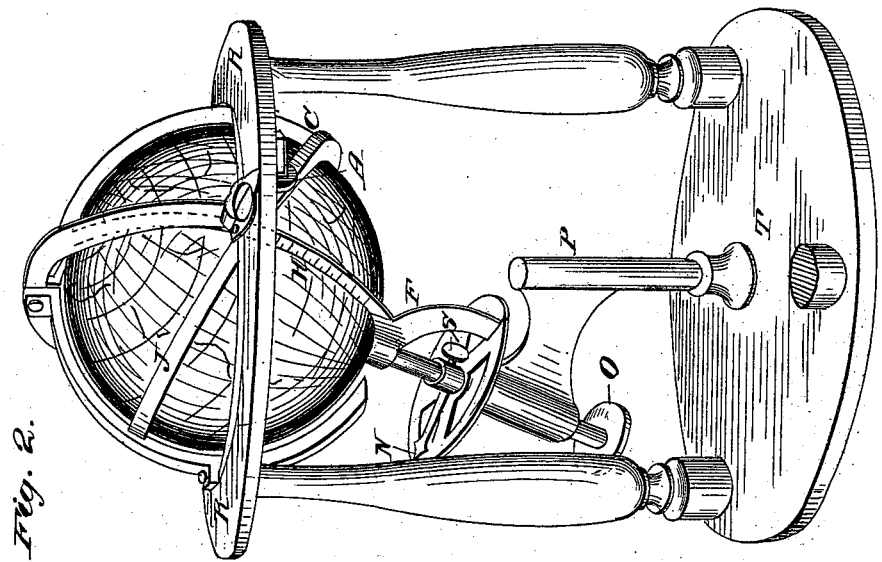
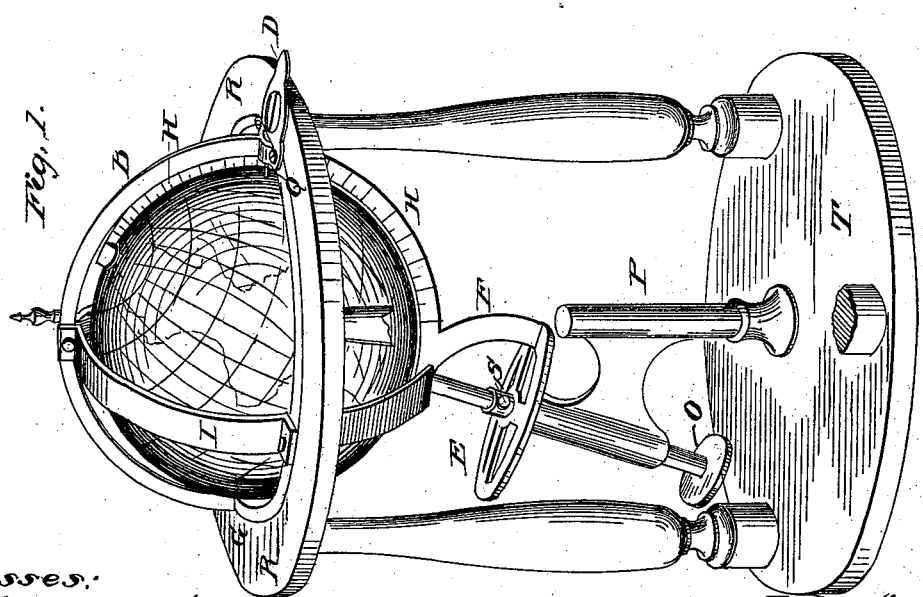

2 Sheets—Sheet 2.

M. TURNBULL & J. FOSTER.
Terrestrial Globe.

No. 209,993. Patented Nov. 19, 1878.

UNITED STATES PATENT OFFICE.

MUNGO TURNBULL AND JAMES FOSTER, OF TORONTO, ONTARIO, CANADA.

IMPROVEMENT IN TERRESTRIAL GLOBES.

Specification forming part of Letters Patent No. 209,993, dated November 19, 1878; application filed July 13, 1878.

*To all whom it may concern:*

Be it known that we, MUNGO TURNBULL and JAMES FOSTER, of Toronto, in the Province of Ontario and Dominion of Canada, have invented certain new and useful Improvements in Educational Terrestrial Globes; and we do hereby declare that the following is a full, clear, and exact description thereof, which will enable others skilled in the art to which it appertains to make to make and use the same, reference being had to the accompanying drawings, which form a part of this specification.

Figure 3:
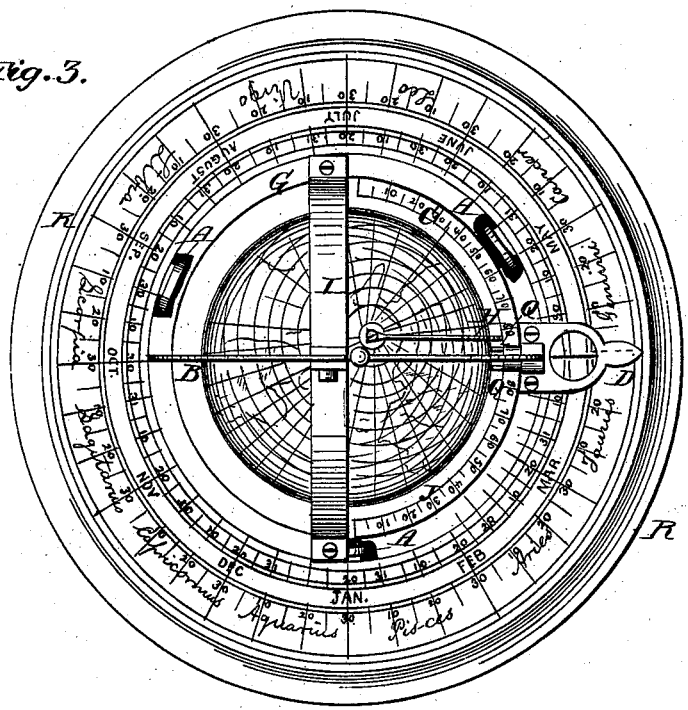
Figure 4:
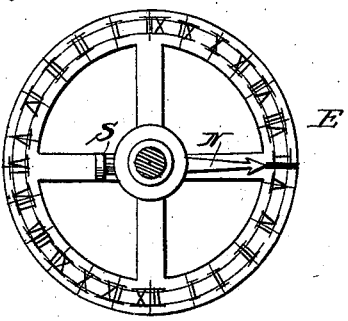

Figure 1 is a view, in perspective, of an educational terrestrial globe embodying the improvements of my invention. Fig. 2 is also a view, in perspective, in a different position. Fig. 3 is a plan view; and Fig. 4 is a plan of the circle, on which are marked the hours or degrees, either east or west, of the solar meridian.

This invention has relation to improvements in educational terrestrial globes; and consists, first, in providing said globe with a zone or ring representing the terrestrial twilight; secondly, in providing said globe with a revolving ecliptic, which exhibits the position of the sun; thirdly, with a movable solar meridian, which shows for every day the angular change that takes place between the ecliptical polar axis and that of the earth's; fourthly, with mechanism for producing the motion of the solar meridian over the position of the sun, giving his declinations north or south; fifthly, providing the globe with an azimuth circle, placed between the ecliptic and the earth, for showing at any point on the earth the sun's altitude at any hour on each side of the meridian where he is visible; sixthly, in providing said globe with an axial vernier, having graduated circle around the south pole, for reading terrestrial longitude in either hours of time or in degrees of an arc, all of which will be hereinafter fully described, and particularly pointed out in the claims.

In the accompanying drawings similar letters of reference indicate like parts in the invention.

The objects sought to be accomplished by this improved manner of mounting the globe are to extend its usefulness as an assistant in the study of geography, and one of the leading features aimed at is to bring before the eye of the student by mechanical appliances a representation of the causes from whence all those changes which the different parts of the earth's surface undergo relative to light and heat during the year, and also to enable the student to solve some new and useful geographical problems not solvable by any other educational globe heretofore constructed. To accomplish these results the axial inclination of the earth to the ecliptic is adopted, and that plane or pathway of the sun in the heavens is substituted for the old plan of using the wooden horizon.

A great circle, consisting of an outer circle, R, and an inner circle, G, represents the ecliptic plane. The outer circle, R, is fixed to the tripod, and upon it is marked the twelve constellations of the zodiac, divided into thirty degrees each, and also the annual calendar of days. Every degree is opposite to the day of the month where the sun's center is situated at the time. The inner brass circle, G, revolves around the globe upon friction-rollers A, connected to the under side of the circle R, and carries the sun's center and all the other mechanical appendages. The dark zone or ring I, which surrounds the globe, is eighteen degrees broad, represents the terrestrial twilight, and is fixed to the revolving ecliptic G at right angles thereto. The edge of this zone next to the position of the sun, which is indicated at D, is always over the center of the globe, and exactly ninety degrees away from the sun's center. Hence, as the sun illuminates but one hemisphere of the earth at any instant, the edge, or beginning of twilight, gives accurately the boundary of sunlight and the beginning of darkness around the earth for every day in the year. The opposite edge of the zone I at the same time shows when the beginning and end of twilight takes place upon any parallel of latitude in the hemisphere of midnight darkness. A brass semicircle, H, is graduated and permanently fixed from pole to pole of the globe. This semicircle always represents the true position of the solar meridian, as it is carried around the stationary ecliptic by the sun's center between two friction-pins, Q Q, placed on each side of said center, and, being a movable meridian with the sun, it serves to show for every day the angular changes which take place between the ecliptical polar axis and the earth's axis. The graduated solar meridian H has also another distinct important motion as it revolves with the sun. In its motion the degrees rise and sink alternately upon the fixed ecliptic plane R, and thus reads off the solar declinations from the equator, and illustrates the astronomical doctrine that the sun apparently shifts in declination toward the north while it is moving through the ascending signs of the ecliptic from Capricorn to Cancer, and descends daily south while passing through the descending signs from Cancer to Capricorn.

The device D, for indicating the position of the sun, which is attached to the revolving inner ecliptical circle, G, consists of a brass ring having a fine wire traversing it diametrically, which reads off the ecliptical place of the sun's center for the day of the month required in the calendar. The divided semicircle J C revolves with the sun in the ecliptic, and at the same time has a motion around his center, and is graduated into two quadrants of ninety degrees each. In practical geography these quadrants will give approximately the distance in degrees of any place from sunrise or sunset on any parallel of latitude where the sun is visible.

The circle E is placed upon the south polar axis of the globe, and is divided into three hundred and sixty degrees of longitude, and also into hours of civil time. The bracket or brass arm F carries the circle E around with the revolving solar meridian H, so that twelve o'clock noon is always with the sun's center, which is the true zero for reading the longitude of any meridian, either east or west, on the globe.

The handle O is for giving the globe axial motion and for working problems in practical geography. The terrestrial hour-hand N can be shifted and fixed by a screw, S, to the axis of the globe to suit any meridian. This hand or pointer N revolves, when fixed to any meridian, upon the upper face of the circle E, and points off, as required, the hours in civil time, or the degrees in longitude, either east or west, of the solar meridian.

T is the base upon which the standard P is secured, and this standard, which is adjustable by means of screws, supports the globe and its axis at the required astronomical angle to the ecliptic R- G — viz., twenty-three degrees twenty-eight minutes of an arc—thereby giving for every day in the year an eye illustration of the parallelism of the earth's axis, and all the consequences of the seasons which are annually experienced.

The semicircle B represents the plane in which the axis of the ecliptic is situated. This axis is ninety degrees from the sun's center, and around it the twilight-zone I or daylight-terminator revolves with the sun. The pole of the ecliptic forms the principal standard of reference to trace the constant-changing angles which the earth's axis makes with it in completing a revolution around the sun. The north pole of the earth revolves around this axis in twenty-five thousand nine hundred and seventy-two years. This motion is known in astronomy as the "precession of the equinoxes"—that is, the vernal equinox, or first of Aries, shifts westward on the ecliptic at the rate of fifty seconds of arc annually. The above period is the great solar cycle.

To show briefly what are the scientific uses of this globe in geographical investigations, the scientific properties of the dark broad ring I are selected. This ring represents continually the width and position of that band or zone of faint refracted light known as the "terrestrial twilight." It extends in width to an arc on the earth's surface of eighteen degrees, or one thousand two hundred and fifty English miles, geometrically, to all places on the globe below the edge of this zone, next the sun's place in the ecliptic. That luminary is either rising or setting, as the different places happen to be in either the eastern or western hemisphere at the time. Hence it forms the chief geographical nonious, to point out for every instant the true astronomical time of the dawn of twilight; also, the sunrise and sunset, and the end of twilight, or the beginning of midnight darkness to any place directly below its edge.

In the old plan of mounting without this appendage these problems cannot be solved.

Again, problem: Any place being given on the globe, to find at what time the twilight dawned and the sun rose, and when it set and the twilight ended at that place.

Example: With the revolving ecliptic, set the device D, which represents the position of the sun, opposite to the chosen day in the annual calendar, then bring the place on the globe to the given apparent or solar meridian for the day; which done, screw the vernier N fast to the earth's axis, when it points to the same meridian; then by bringing back the place on the earth to the two edges of the eastern morning twilight zone I, the correct astronomical time of the dawn of twilight and sunrise will be read off by the vernier in hours and degrees on the graduated circle around the south polar axis of the earth, and by turning the globe west till the assumed place reaches the opposite part of the zone, the exact time of the evening vicissitudes of sunset and the end of twilight will also be correctly given.

Moreover, in the study of terrestrial geography it has other uses than that of being an exact resolver of longitude, or for giving civil time to any place. To the sight it acts the part of a great distributer of light and heat on the terrestrial illuminated surface, which is shown to be reciprocal over the two hemispheres; for as the sun apparently moves from the winter to the summer solstice, from Capricorn to Cancer, it brings into view how the versed sines of the different parallels of latitude come into the sun's light over all the northern portion of the globe, while in the southern, during the time, the phenomena is reversed. In fact, with this scientific appendage, the pupil can always place himself directly between the sun and the earth, and all its different phases, for every day in the year, pass before him like a well-directed panorama; hence the motion of the material representation of the twilight sky around the globe forms one of the principal improvements claimed for this educational instrument.

Another new arrangement is the substitution of the plane of the ecliptic for the old wooden horizon around the globe.

In the Copernican description or system of the universe, it is well known that the ecliptic plane forms the chief and surest place of reference to trace the mechanical position of all physical things around us, whether they are to be found on the surface of the earth or to be seen in the heavens. Consequently, the apparent motion of the sun in this plane being invariable, and at the same time around the exact inclined terrestrial axis, as shown, and regulating all the other mechanical appendages, gives a perfect transparency and simplicity to the solution of problems hitherto complicated, not only in geography, but in its sister branch of learning—elementary astronomy.

To the inhabitants of the northern hemisphere it can be well shown that the sunlight history of the North Pole of our globe forms the grand center around which the cause of the seasons revolve. By its motion within and without the twilight region, especially at the four principal annual epochs of time, the illustration becomes very complete. For example, at the winter solstice, (December 22,) how the pole is seen to be thrown over twenty-three and a half degrees into the dark hemisphere, where within the entire Arctic surface it is hid from view. Then at the vernal equinox (March 20) the pole is just seen emerging from its five months' darkness, thus causing equal days and nights over all the earth. Again, at the summer solstice, (June 21,) the pole having reached the position of being twenty-three and a half degrees from the twilight zone, the whole of the frigid zone becomes illuminated by a sun which, for a time, cannot set, and during the period we have in the north the pleasant months of summer. In the next six months' motion the preceding order of things will be completely reversed, till the sun arrives again at the winter solstice, to commence anew his annual course.

It is worthy of notice that during the year the twilight sky sweeps twice over the two frigid zones of the globe; but over the other three it moves only once in the same time.

In reference to the three other mechanical arrangements, formerly mentioned, relative to the solution of the solar declinations and finding the sun's azimuth at any time and place, along with the process to trace the longitude on the globe in hours or in degrees of an arc, the mere inspection of the different appendages will suffice to show the humblest student the way to make them serviceable for what they are respectively intended to solve.

Having thus described my invention, what I claim as new and useful, and desire to secure by Letters Patent of the United States, is—

1. In an educational terrestrial globe, a revolving ecliptic, G, having the device D, for representing the position of the sun therein, substantially as set forth.

2. In an educational terrestrial globe, the combination, with the solar meridian H, secured to the poles of the globe, with the revolving ecliptic G, provided with friction-pins Q Q opposite the sun's place D, for carrying with it the movable solar meridian, substantially as and for the purposes set forth.

3. In an educational terrestrial globe, the azimuth circle J C, placed between the ecliptic, composed of the circles R G and the earth, for the purpose of showing at any point upon the earth the sun's altitude, substantially as shown and described.

4. In an educational globe, the ecliptic R, marked with the twelve constellations of the zodiac, divided into thirty degrees each, and the annual calendar of days, in combination with the revolving ecliptic G, provided with the sun's place D, substantially as and for the purpose set forth.

5. In an educational terrestrial globe, the combination of the ecliptic R G, sun's place D, movable solar meridian H, azimuth semicircle J C, semicircle B, twilight-zone I, graduated circle E, and axial vernier N, constructed and operating substantially as and for the purposes set forth.

In testimony that we claim the foregoing as our own we have hereto affixed our signatures in presence of two witnesses.

MUNGO TURNBULL.
    JAMES FOSTER.

Witnesses:
 JOHN CRICKMORE,
 J. H. FOSTER.